US008654776B2

(12) United States Patent
Sala et al.

(10) Patent No.: US 8,654,776 B2
(45) Date of Patent: *Feb. 18, 2014

(54) SCHEDULING WIRELESS COMMUNICATIONS

(75) Inventors: Dolors Sala, Atlanta, GA (US); Ajay Chandra V. Gummalla, Duluth, GA (US); John O. Limb, Atlanta, GA (US); Richard Protus, Norcross, GA (US)

(73) Assignee: Broadcom Corporation, Irvine, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 13/101,751

(22) Filed: May 5, 2011

(65) Prior Publication Data

US 2011/0211479 A1    Sep. 1, 2011

Related U.S. Application Data

(63) Continuation of application No. 11/892,932, filed on Aug. 28, 2007, now Pat. No. 7,940,774, which is a continuation of application No. 09/783,404, filed on Feb. 15, 2001, now Pat. No. 7,333,495, which is a continuation-in-part of application No. 09/427,792, filed on Oct. 27, 1999, now Pat. No. 6,804,251.

(60) Provisional application No. 60/182,470, filed on Feb. 15, 2000, provisional application No. 60/247,188, filed on Nov. 9, 2000, provisional application No. 60/254,415, filed on Dec. 8, 2000, provisional application No. 60/262,201, filed on Jan. 17, 2001, provisional application No. 60/262,203, filed on Jan. 17, 2001.

(51) Int. Cl.
*H04L 12/28* (2006.01)
*H04L 12/56* (2011.01)

(52) U.S. Cl.
USPC ............. 370/395.41; 370/236; 370/420

(58) Field of Classification Search
USPC .......... 370/229–238, 252–253, 470–471, 370/395.4–395.42
See application file for complete search history.

(56) References Cited

U.S. PATENT DOCUMENTS 4,534,024 A    8/1985   Maxemchuk et al.
4,712,210 A   12/1987   Davis et al.
(Continued)

FOREIGN PATENT DOCUMENTS

EP    0 573 739 A2   12/1993
EP    0 774 848 A2    5/1997
(Continued)

OTHER PUBLICATIONS

John O. Limb and Dolors Sala, "A Protocol for Efficient Transfer of Data over Hybrid Fiber/Coax Systems," *IEEE/ACM Transactions on Networking*, vol. 5, No. 6, pp. 872-881, (Dec. 1997).

(Continued)

*Primary Examiner* — Thai Hoang
(74) *Attorney, Agent, or Firm* — Sterne Kessler Goldstein & Fox, PLLC

(57) ABSTRACT

A system and method is provided for scheduling transmissions from a plurality of services operating over a widely distributed communications network. A headend communications device (such as a cable modem termination system) arbitrates bandwidth among a plurality of cable modems configurable for bi-directional communications. The headend grants a bandwidth region to a specified cable modem or assigns contention regions for a group of cable modems. Each cable modem contains a local scheduler that sends requests for bandwidth according to local policies or rules. Upon receipt of a grant from the headend, the local scheduler selects packets to be transmitted to best serve the needs of the services associated with the cable modem. Accordingly, a service requesting bandwidth may not be the service utilizing the grant corresponding to bandwidth request. Nonetheless, the local scheduler manages bandwidth allocation among its local services such that all requesting services eventually receive bandwidth.

22 Claims, 4 Drawing Sheets

(56) References Cited

U.S. PATENT DOCUMENTS

| | | | |
|---|---|---|---|
| 5,315,586 A | 5/1994 | Charvillat | |
| 5,341,374 A | 8/1994 | Lewen et al. | |
| 5,421,030 A | 5/1995 | Baran | |
| 5,425,027 A | 6/1995 | Baran | |
| 5,463,624 A | 10/1995 | Hogg et al. | |
| 5,469,495 A | 11/1995 | Beveridge | |
| 5,515,379 A | 5/1996 | Crisler et al. | |
| 5,539,449 A | 7/1996 | Blahut et al. | |
| 5,570,355 A | 10/1996 | Dail et al. | |
| 5,606,561 A | 2/1997 | Scheibel, Jr. et al. | |
| 5,631,908 A | 5/1997 | Saxe | |
| 5,742,592 A | 4/1998 | Scholefield et al. | |
| 5,742,772 A | 4/1998 | Sreenan | |
| 5,756,280 A | 5/1998 | Soora et al. | |
| 5,850,400 A | 12/1998 | Eames et al. | |
| 5,914,950 A | 6/1999 | Tiedemann et al. | |
| 5,926,478 A | 7/1999 | Ghaibeh et al. | |
| 5,963,557 A | 10/1999 | Eng | |
| 5,982,780 A | 11/1999 | Bohm et al. | |
| 6,028,860 A | 2/2000 | Laubach et al. | |
| 6,055,268 A | 4/2000 | Timm et al. | |
| 6,185,224 B1 | 2/2001 | Limb et al. | |
| 6,259,695 B1 | 7/2001 | Ofek | |
| 6,314,103 B1 | 11/2001 | Medhat et al. | |
| 6,314,466 B1 | 11/2001 | Agarwal et al. | |
| 6,359,901 B1 | 3/2002 | Todd et al. | |
| 6,363,079 B1 | 3/2002 | Barzegar et al. | |
| 6,421,355 B1 | 7/2002 | Quiring et al. | |
| 6,438,141 B1 | 8/2002 | Hanko et al. | |
| 6,438,630 B1 | 8/2002 | DeMoney | |
| 6,463,484 B1 | 10/2002 | Moss | |
| 6,466,544 B1 | 10/2002 | Sen et al. | |
| 6,480,506 B1 | 11/2002 | Gubbi | |
| 6,546,017 B1 | 4/2003 | Khaunte | |
| 6,563,829 B1 * | 5/2003 | Lyles et al. | 370/395.21 |
| 6,580,730 B1 | 6/2003 | Loukianov | |
| 6,590,865 B1 | 7/2003 | Ibaraki et al. | |
| 6,628,609 B2 | 9/2003 | Chapman et al. | |
| 6,650,630 B1 | 11/2003 | Haartsen | |
| 6,658,457 B2 | 12/2003 | Nishikawa et al. | |
| 6,724,772 B1 | 4/2004 | Borland et al. | |
| 6,771,661 B1 | 8/2004 | Chawla et al. | |
| 6,778,495 B1 | 8/2004 | Blair | |
| 6,804,251 B1 | 10/2004 | Limb et al. | |
| 6,876,668 B1 | 4/2005 | Chawla et al. | |
| 6,917,614 B1 | 7/2005 | Laubach et al. | |
| 6,993,007 B2 | 1/2006 | Gummalla et al. | |
| 6,993,414 B2 | 1/2006 | Shah | |
| 6,999,414 B2 | 2/2006 | Gummalla et al. | |
| 7,061,929 B1 | 6/2006 | Eberle et al. | |
| 7,203,164 B2 | 4/2007 | Gummalla et al. | |
| 7,219,347 B1 | 5/2007 | Waddington | |
| 7,237,016 B1 | 6/2007 | Schober | |
| 7,272,119 B2 | 9/2007 | Rudnick et al. | |
| 7,333,495 B2 * | 2/2008 | Sala et al. | 370/395.21 |
| 7,388,884 B2 | 6/2008 | Bunn et al. | |
| 7,512,154 B2 | 3/2009 | Quigley et al. | |
| 7,602,721 B1 * | 10/2009 | Tangirala et al. | 370/235.1 |
| 7,940,774 B2 * | 5/2011 | Sala et al. | 370/395.21 |
| 2001/0053159 A1 | 12/2001 | Bunn et al. | |
| 2005/0008027 A1 | 1/2005 | Limb et al. | |
| 2006/0088057 A1 | 4/2006 | Gummalla et al. | |
| 2007/0030807 A1 | 2/2007 | Gummalla et al. | |
| 2007/0242673 A1 | 10/2007 | Limb et al. | |
| 2007/0242693 A1 | 10/2007 | Limb et al. | |
| 2007/0297436 A1 | 12/2007 | Sala et al. | |
| 2011/0170507 A1 | 7/2011 | Limb et al. | |

FOREIGN PATENT DOCUMENTS

| | | |
|---|---|---|
| EP | 0 829 986 A1 | 3/1998 |
| EP | 0 844 803 A2 | 5/1998 |
| EP | 0 912 016 A2 | 4/1999 |
| WO | WO 98/45678 A1 | 10/1998 |
| WO | WO 99/18718 A1 | 4/1999 |
| WO | WO 99/30449 A1 | 6/1999 |

OTHER PUBLICATIONS

Limb, J., et al., "An Access Protocol to Support Multimedia Traffic Over Hybrid Fiber/Coax Systems", Proceedings of the International Workshop on Community Networking Integrated Multimedia Services to the Home, pp. 35-40, (Jun. 1995).

"Radio Frequency Interface Specification SP-RFIv1.1-I02-990731," Data-Over-Cable Service Interface Specifications, retrieved from the Internet on Oct. 23, 2001:<URL:http://www.tconl.com/ikleens/DOCSIS.pdf>, pp. i-iv, 132-139 and 291-296, (Jul. 1999).

Sala, D., et al., "Adaptive Control Mechanism for Cable Modem MAC Protocols," *Proceedings of the IEEE INFOCOM, IEEE*, vol. 3, pp. 1392-1399, (Mar. 1988).

Sumner, M., "DOCSIS 1.1 Overview," *CableLabs.RTM.*, 16 pgs., (May 1999).

Hogan, M., et al., "An Architectural Framework for the Support of Integrated Services by Broadband Customer Premises Equipment," XP004059230, *Computer Networks and ISDN Systems*, vol. 25, No. 5, pp. 595-509, (Apr. 1997).

Examination for European Application No. 01910716.8-1247 mailed Oct. 9, 2009, 5 pages.

International Search Report issued Nov. 8, 2001, for Appln. No. PCT/US01/04841, 5 pages.

International Search Report issued Nov. 8, 2001, for Appln. No. PCT/US01/04904, 4 pages.

International Search Report issued Sep. 28, 2001, for Appln. No. PCT/US01/04819, 7 pages.

International Search Report for Appl. No. PCT/US01/04820 issued Sep. 27, 2001, 8 pages.

Office Communication, dated Sep. 8, 2004, for U.S. Appl. No. 09/783,404, filed Feb. 15, 2001 (now U.S. Pat. 7,333,495), 8 pages.

Office Communication, dated Apr. 4, 2005, for U.S. Appl. No. 09/783,404, filed Feb. 15, 2001 (now U.S. Pat. 7,333,495), 7 pages.

Office Communication, dated Aug. 4, 2005, for U.S. Appl. No. 09/783,404, filed Feb. 15, 2001 (now U.S. Pat. 7,333,495), 3 pages.

Office Communication, dated Aug. 10, 2006, for U.S. Appl. No. 09/783,404, filed Feb. 15, 2001 (now U.S. Pat. 7,333,495), 3 pages.

Office Communication, dated Apr. 23, 2007, for U.S. Appl. No. 09/783,404, filed Feb. 15, 2001 (now U.S. Pat. 7,333,495), 3 pages.

Office Communication, dated Sep. 19, 2007, for U.S. Appl. No. 09/783,404, filed Feb. 15, 2001 (now U.S. Pat. 7,333,495), 1 page.

Office Communication, dated Jan. 27, 2003, for U.S. Appl. No. 09/427,792, filed Oct. 27, 1999 (now U.S. Pat. 6,804,251), 6 pages.

Office Communication, dated Aug. 12, 2003, for U.S. Appl. No. 09/427,792, filed Oct. 27, 1999 (now U.S. Pat. 6,804,251), 7 pages.

Office Communication, dated Jan. 15, 2004, for U.S. Appl. No. 09/427,792, filed Oct. 27, 1999 (now U.S. Pat. 6,804,251), 7 pages.

Office Communication, dated Feb. 28, 2004, for U.S. Appl. No. 09/427,792, filed Oct. 27, 1999 (now U.S. Pat. 6,804,251), 3 pages.

Office Communication, dated Sep. 4, 2008, for U.S. Appl. No. 10/910,622, filed Aug. 4, 2004, (now U.S. Pat. 7,697,543), 10 pages.

Office Communication, dated Apr. 9, 2009, for U.S. Appl. No. 10/910,622, filed Aug. 4, 2004, (now U.S. Pat. 7,697,543), 14 pages.

Office Communication, dated Sep. 12, 2008, for U.S. Appl. No. 11/808,694, filed Jun. 12, 2007, (now U.S. Pat. 7,733,912), 9 pages.

Office Communication, dated Apr. 30, 2009, for U.S. Appl. No. 11/808,694, filed Jun. 12, 2007, (now U.S. Pat. 7,733,912), 6 pages.

Office Communication, dated Apr. 27, 2009, for U.S. Appl. No. 11/808,696, filed Jun. 12, 2007, (now U.S. Pat. 7,912,066), 11 pages.

Office Communication mailed Jan. 12, 2010 for U.S. Appl. No. 11/808,696, filed Jun. 12, 2007, (now U.S. Pat. 7,912,066), 8 pages.

Office Communication mailed Jul. 13, 2010 for U.S. Appl. No. 11/808,696, filed Jun. 12, 2007, (now U.S. Pat. 7,912,066), 7 pages.

Office Communication, dated Nov. 24, 2009, for U.S. Appl. No. 10/910,622, filed Aug. 4, 2004, (now U.S. Pat. 7,697,543), 14 pages.

Office Communication, dated Jan. 12, 2010, for U.S. Appl. No. 11/808,696, filed Jun. 12, 2007, 8 pages.

(56) References Cited

OTHER PUBLICATIONS

Office Communication, dated Jun. 8, 2010, for U.S. Appl. No. 11/892,932, filed Aug. 28, 2007, 6 pages.
Notice of Allowance, dated Nov. 5, 2010, for U.S. Appl. No. 11/808,696, filed Jun. 12, 2007, 6 pages.
Notice of Allowance, dated Dec. 29, 2010, for U.S. Appl. No. 11/892,932, filed Aug. 28, 2007, 6 pages.
Office Communication, dated Jun. 18, 2013, for U.S. Appl. No. 13/052,853, filed Mar. 21, 2011, 9 pages.
Notice of Allowance, dated Oct. 7, 2013, for U.S. Appl. No. 13/052,853, filed Mar. 21, 2011, 9 pages.

* cited by examiner

GLOBAL CM STATE DIAGRAM

QUEUE STATE DIAGRAM

SCHEDULING WIRELESS COMMUNICATIONS

CROSS-REFERENCE TO RELATED APPLICATIONS

This application is a continuation of U.S. patent application Ser. No. 11/892,932 which was filed on Aug. 28, 2007, which is a continuation of U.S. patent application Ser. No. 09/783,404 entitled "Method, System and Computer Program Product for Scheduling Upstream Communications," filed Feb. 15, 2001, which is a continuation-in-part of U.S. patent application Ser. No. 09/427,792, entitled "System and Method for Multiplexing Data from Multiple Sources," filed Oct. 27, 1999, by Limb et al., all of which are incorporated by reference herein in their entirety. U.S. patent application Ser. No. 09/783,404 claims the benefit of the following United States provisional applications:

U.S. Patent Application No. 60/182,470, entitled "Intelligent Silence Suppression," filed Feb. 15, 2000, by Gummalla et al., (abandoned), which is incorporated by reference herein in its entirety;

U.S. Patent Application No. 60/247,188, entitled "A Local Scheduling Mechanism for Cable Modems," filed Nov. 9, 2000, by Sala et al., (abandoned), which is incorporated by reference herein in its entirety;

U.S. Patent Application No. 60/254,415, entitled "A Local Scheduling Mechanism for Cable Modems," filed Dec. 8, 2000, by Sala et al. (abandoned), which is incorporated by reference herein in its entirety;

U.S. Patent Application No. 60/262,201, entitled "Voice Scheduling Algorithms," filed Jan. 17, 2001, by Sala et al. (abandoned), which is incorporated by reference herein in its entirety; and U.S. Patent Application No. 60/262,203, entitled "Concatenation of Requests at CMTS," filed Jan. 17, 2001, by Sala et al. (abandoned), which is incorporated by reference herein in its entirety.

The following United States utility patent applications have a common assignee and contain some common disclosure:

"Voice Architecture for Transmission Over a Shared, Contention Based Medium," U.S. patent application Ser. No. 09/785,020, by Gummalla et al., filed Feb. 15, 2001, which is incorporated by reference herein in its entirety;

"System and Method for Suppressing Silence for Support in Voice Traffic over an Asynchronous Communication Medium," U.S. patent application Ser. No. 09/783,405, by Gummalla et al., filed Feb. 15, 2001, which is incorporated by reference herein in its entirety;

"Cable Modem System and Method for Specialized Data Transfer," U.S. patent application Ser. No. 09/783,403, by Bunn et al., filed Feb. 15, 2001, which is incorporated by reference herein in its entirety; and "System and Method for Combining Requests for Data Bandwidth by a Data Provider for Transmission of Data Over an Asynchronous Communication Medium," U.S. patent application Ser. No. 09/783,311, by Gummalla et al., filed Feb. 15, 2001, which is incorporated by reference herein in its entirety.

BACKGROUND OF THE INVENTION

1. Field of the Invention

The present invention is directed to controlling network transmissions. More particularly, the present invention relates to scheduling transmissions from multiple clients in a network environment.

2. Background Art

With the advent of the Internet, it has become more commonplace to develop vast communications networks to readily exchange information over remote areas. As modern technology continues to evolve to create new services to be provided over communications media, a greater demand has been generated for bandwidth and improved quality of services. For example, television broadcasts historically involved one-way communication from a broadcast transmitter to a viewer's home. As interactive or personal television services continue to grow, communications media used to support one-way communications must now contend with an increased demand for bi-directional communications.

In a conventional communications network, a communications device (such as a modem) would request bandwidth from a headend prior to transmitting data to its destination. The headend would allocate bandwidth to the cable modem based on availability and competing demands from other modems. The allocation of bandwidth is typically granted to the requesting modem in a MAP. The cable modem would be required to follow the instructions specified in the MAP, and use the grant for the service specified in the MAP.

Problems arise when the service specified in the MAP is later determined to no longer require the bandwidth, or require more bandwidth than originally requested. Another problem can occur if another service of equal or higher priority should require immediate bandwidth shortly after the headend's granting a lower-priority service's request bandwidth. The cable modem may not be able to use the granted bandwidth to transmit data from the higher priority service, because the grant would be restricted to the lower priority service. For example, a DOCSIS-compliant network system specifies that a cable modem must accept decisions made during the requesting phase.

One mechanism that can be implemented to reduce latency would be to utilize piggyback requests for bandwidth. Piggyback requests can be very effective if a cable modem is operating in a contention mode, where the modem transmit packets without a specified grant. Transmitting a signal during a contention mode increases the likelihood of the packets colliding, getting loss or becoming corrupted.

However, the conventional way of piggybacking requests is to use variable sized headers. The header can be extended to incorporate the piggyback request when there exist a need to send one. This is a common practice in a DOCSIS-compliant environment. This approach is more effective if the header is very small and/or the size of the request message is also small. Otherwise, piggybacking requests can add excessive packet overhead that require more bandwidth or may cause packet latency.

Consequently, a system and method are needed to solve the above-identified problems and provide a simple, efficient and cost-effective way to schedule communications in an classify packets in a dynamic environment.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Table of Contents

Figure 1:
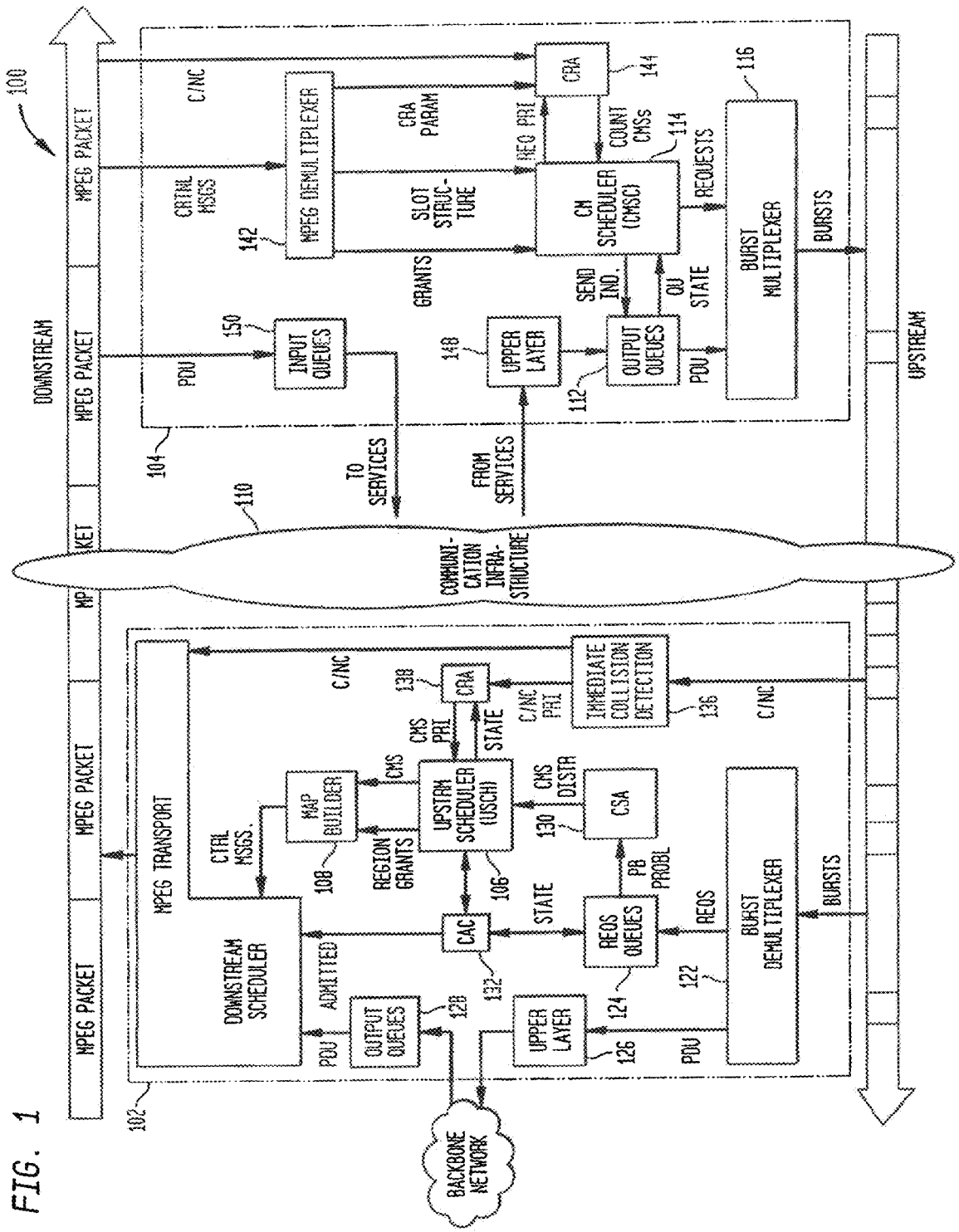
FIG. 1 illustrates a data traffic management system according to an embodiment of the present invention.

I. Data Traffic Management System Overview
II. Cable Modem Scheduling
III. Piggybacking Bandwidth Requests
IV. Conclusion I. Data Traffic Management System Overview FIG. 1 illustrates data traffic management system 100 according to an embodiment of the present invention. System 100 is preferably, but not necessarily, of the type described in U.S. Patent Ser. No. 60/247,188, entitled "A Local Scheduling Mechanism for Cable Modems," filed Nov. 9, 2000, by Sala et al., (still pending), which is incorporated by reference herein in its entirety.

System 100 includes a headend or cable modem termination system (CMTS) 102 that exchanges data with one or more cable modems 104 over a communications interface 110, which includes wired or wireless local area networks (LAN) or wide area networks (WAN), such as an organization's intranet, local internets, the global-based Internet (including the World Wide Web (WWW), private enterprise networks, or the like. Communications interface 110 includes wired, wireless or both, transmission media, including satellite, terrestrial (fiber optic, copper, coaxial and the like), radio, microwave and any other form or method of transmission. In an embodiment, CMTS 102 and cable modem 104 can be integrated to support protocols, such as, Internet Protocol (IP), Transmission Control Protocol (TCP), User Datagram Protocol (UDP), Real Time Transport Protocol (RTP), Resource Reservation Protocol (RSVP), or the like.

One or more downstream channels carry information (such as, television signals, IP data packets, control messages in MPEG format) from CMTS 102 to the plurality cable modems 104. Similarly, one or more upstream channels carry bursts of packets from the cable modems 104 to CMTS 102. In an embodiment, the bursts are assigned or allocated by mini-slots prior to upstream transmissions. In another embodiment, the bursts are quantified and apportioned by bits, bytes, mini-ticks (such as 2.5 μm per click) or like metrics for apportioning bandwidth regions. The burst includes bandwidth requests from cable modems 104 and transmissions of data from the corresponding services, as discussed in greater detail below.

CMTS 102 includes an upstream scheduler 106 that arbitrates bandwidth requirements among multiple cable modems 104. Map builder 108 also is included within CMTS 102 to transmit a MAP containing upstream slot specifications and grant specifications to cable modems 104. In an embodiment, MAPs are introduced into the MPEG transport stream of downstream communication as control messages.

Bursts from cable modems 104 are received by burst demultiplexer 122, which forms the physical layer interface between CMTS 102 and the upstream channel from communications interface 110. Burst demultiplexer 122 sends bandwidth request to request queue 124 and other packets to upper layer 126, which forwards the packet to another device or application, such as a web browser, another cable modem 104, or other data receiver. Packets from these other data receivers are collected by output queue 128 for external use.

A contention slot allocator (CSA) 130 specifies which areas in an upstream channel are to be used as assigned bandwidth regions for grants and contention transmissions. In an embodiment, if no requests are resident in request queue 124, the bandwidth region is allocated to contention transmissions. In an embodiment, a piggyback probability metric is sent from request queue 124 to CSA 130 to aid CSA 130 in determining the percentage of bandwidth to allocate for grants and contention transmissions.

The state of request queue 124 is sent to call admission controller (CAC) 132 that decides whether to admit more traffic into system 100. In an embodiment CAC 132 is operable to process voice data and generate a call admission signal if a call is accepted. The call admission signal is sent downstream to the cable modem 104 that is requesting a call admission. However CAC 132 is not limited for use with voice data. CAC 132 can support other forms of media and multimedia. CAC 132 also sends the parameters for establishing queues within upstream scheduler 106, and upstream scheduler 106 notifies CAC 132 after the queues have been established. Upstream scheduler 106 also received information from CSA 130 representative of the distribution of contention bandwidth regions or contention mini-slots (CMS). Based on information received from CAC 132, CSA 130 and a collision resolution algorithm device (CRA) 138, upstream scheduler 106 specifies the bandwidth regions for grants and contention requests.

Collision detector 136 monitors contention regions in the upstream channels on a continuous basis to detect a collision immediately if a collision occurs. Collision detector 136 sends a collision/no collision (C/NC) signal to CRA 138, which uses the C/NC signal to adjust the CRA parameters. This allows the C/NC signal and an acknowledgment/no acknowledgment message to be sent downstream to enable cable modem 104 to resent the collided request.

Each cable modem 104 hosts one or more services to a subscriber. The services (typically identified by a service identification or SID) include telephony, television broadcasts, internet communications (e.g., WWW), facsimile, file data transfer, electronic mailing services (email), video conferencing, live or time-delayed feeds (such as, speeches, debates, presentations, news reports, sporting events, concerts, etc.), and the like. Hence, the data exchanged between CMTS 102 and cable modems 104 includes text, video, audio, voice, graphics, other media or a combination thereof (i.e., multimedia).

Cable modem 104 includes an output queue 112, CM scheduler 114 and burst multiplexer 114. Each service provided by cable modem 104 is mapped to one or more priority queues (not shown) within output queue 112. CM scheduler 114 is responsible for deciding the order in which packets are sent, and for controlling and balancing the request/grant loop process for all services. At the appropriate time, CM scheduler 114 directs packets to be sent to burst multiplexer 116, where the packets are multiplexed into a burst.

MAP messages from CMTS 102 are recovered with other messages by a demultiplexer 142. Grants in the MAP messages containing the slot structure and grants for the requesting cable modem 104 are separated and sent to CM scheduler 114 to control the allocation of packets to the granted bandwidth regions. The C/NC signal transmitted downstream and the CRA parameter derived from a control message are sent downstream and used by the downstream CRA 144 to adopt the parameters. CRA 144 sends the count of contention regions to CM scheduler 114. These counts corresponds to the number of priority CMSs the cable model 104 must wait before it can transmit a request in a contention bandwidth region of the same priority.

Input queue 150 stores data received from the upstream until it is ready to be processed by the services. Upper layer 148 receives packets from the services and forwards them to output queue 112.

II. Cable Modem Scheduling

Figure 2:
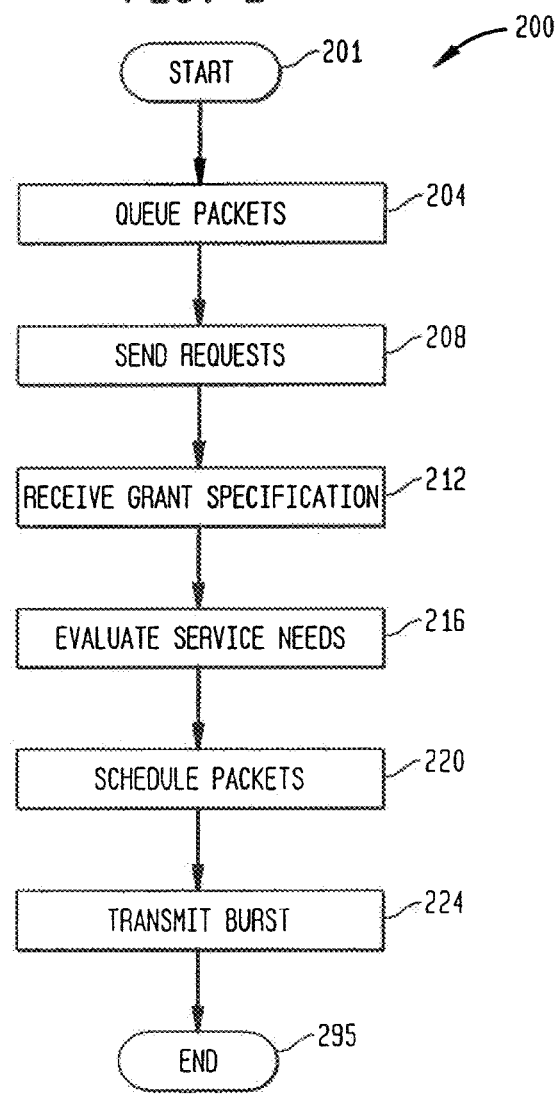
FIG. 2 illustrates an operational flow diagram for the steps involved in scheduling communications according to an embodiment of the present invention.

Referring to FIG. 2, flowchart 200 represents the general operational flow of an embodiment of the present invention. More specifically, flowchart 200 shows an example of a control flow for scheduling data transmissions from cable modem 104 over communication infrastructure 110.

Referring to FIG. 2, the control flow of flowchart 200 begins at step 201 and passes immediately to step 204. At step 204, output queue 112 receives a data packet from a service (e.g., telephony, cable, and the like) and stores the packet within the appropriate priority queue (not shown). Output queue 112 notifies CM scheduler 114 of its queue state on a periodically scheduled basis. In an embodiment, output queue 112 transmits its queue state each time it is modified.

At step 208, upon notification from output queue 112, CM scheduler 114 decides whether to send a request message for bandwidth to CMTS 102, based on internal policies or rules. CMTS 102 prepares a grant specification to allocate bandwidth according to the size specified in the bandwidth request. The grant specification is transmitted to the requesting cable modem 104.

At step 212, CM scheduler 114 receives the grant specification from CMTS 102, and at step 216, CM scheduler 114 evaluates the needs of the service(s) being provided by cable modem 104. In an embodiment, CM scheduler 114 evaluates the needs by considering the current queue state of the priority queues for each service. The current queue state can be evaluated by measuring the quantity of packets, bandwidth size, byte size, or the like. In an embodiment, CM scheduler 114 evaluates the needs of the service(s) by balancing throughput requirements versus latency. For example, it may become necessary to interrupt or fragment a transmission of text data to allow a voice transmission since voice communication require a lower tolerance for delay.

At step 220, CM scheduler 114 determines which packets to send, based on the needs assessment performed at step 212. Therefore, CM scheduler 114 is not required to use a grant in the same order that the corresponding requests were sent. CM scheduler 114 functions as a bandwidth manager that decides how to use the received grants according to the current needs of an active service. Since the needs of a service can change from the time of requesting a grant, CM scheduler 114 is programmable to assign a particular granted region (or portion thereof) to a different service than the one specified in the grant specification.

In an embodiment, CM scheduler 114 is priority based and will empty the priority queue for a higher-priority service before drawing data from the priority queue for a lower-priority service. For example, a higher-priority service (such as, telephony) and a lower-priority service (such a, web browsing) can request bandwidth from CMTS 102. The flexible use of grants provided by cable modem 104 allows the higher-priority service (i.e., telephony) to borrow a first arriving lower-priority grant if the grant arrives earlier than its own grant. The lower-priority service (i.e., web browsing) would be permitted to utilize the bandwidth granted to the higher-priority, unless another higher-priority service is judged to require the grant.

In an embodiment, each service is registered as being a borrower, lender, both or none. As a borrower, the service is permitted to transmit data in a slot granted to another service. As a lender, the service is permitted to allow another service to transmit data over a slot granted to the lender. If registered as none, the service is not permitted to lend or borrow grants. Finally, as both, the service operates as a lender and borrower.

Thus, cable modem 104 is a flexible modem. In other words, CM scheduler 114 is configurable to overwrite a centralized CMTS scheduling decision in a seamless manner, such that the overwriting is virtually undetectable by CMTS 102 or the subscriber receiving the service. As described above, conventional systems (e.g., a DOCSIS-compliant system) must follow the instructions given in a grant. However, CM scheduler 114 decides which priority queues to transmit at the time the data is sent, instead of maintaining the decisions made at the requesting phase. Accordingly, CM scheduler 114 is programmable to change decisions at any time ranging from when CM scheduler 114 first sends a request until it transmits the actual information.

Nonetheless, the grant slots must be scheduled such that CMTS 102 detects a matching between the amount of data requested from a service and the actual amount of data the service is transmitting. In other words, CM scheduler 104 must balance the request/grant loop for each individual service. Additionally, each service must request bandwidth even if it has nothing to send in queue 112 but has used the grants apportioned to other services. As a result, the present invention guarantees that a grant for the other services will be available at some future point in time. Moreover, an advantage of the present invention is that cable modem 104 can reduce the latency of higher-priority services, which manifests a substantial improvement in quality of service. Another advantage of the present invention is that cable modem 104 can operate with more services than the ones that CMTS 102 may have recognized at a given point in time. This is a transient advantage because, as discussed, cable modem 104 permits a borrowing service to used the grant of a lending service, only if a bandwidth request will be transmitted for the borrowing service.

Referring again to FIG. 2, after CM scheduler 114 has selected the packets to be transmitted, the control flow passes to step 224, where burst multiplexer 116 formats the data packets and transmits a burst to CMTS 102. After the burst has been transmitted, the control flow ends as indicated by step 295.

III. Piggybacking Bandwidth Requests

Referring back to FIG. 2, at step 208, CM scheduler 114 transmits bandwidth requests in either contention or piggyback mode. As discussed above, any request transmitted in contention mode bares the risk of being corrupted or loss due to collision.

Piggyback mode can be used to reduce the load of requests in the contention channel. In an embodiment, CM scheduler 114 prepares a piggyback request message that is formatted to have the highest priority for transmissions. Convention piggybacking requests are included as part of an extended header of another message. However, the piggyback request messages of the present invention are separate messages that are transmitted in a contention channel or a reservation channel without making a previous reservation. As used herein, traditional piggybacking is referred to as being piggyback requests in extended headers and independent piggybacking is referred to as being piggyback requests that are sent as separate messages.

Since concatenating messages typically do not introduce any additional overhead, the efficiency of independent piggybacking is comparable to the efficiency gained by using traditional piggybacking for systems with smaller header sizes. For example, an implicit convention for voice packets is the specification of very small headers. An advantage of independent piggybacking is that the piggyback request message can be easily sent anywhere in a burst (i.e., between packets) without imposing any processing delays on CMTS 102, in particularly in cases where headers cannot be easily extended.

As discussed with reference to step 220 as shown in FIG. 2, CM scheduler 114 has the flexibility to use grant slots to optimize throughput and reduce latency. As such, a piggyback request message can be transmitted at anytime upon receipt of a grant specification or in contention mini-slots. The piggyback request message can be inserted in a burst of voice packets or other data packets (i.e., text, graphics). In an embodiment, CM scheduler 114 uses cross-piggybacking to combine a piggyback request message for one service (i.e., primary piggyback) with a piggyback request messages from one or more other services (i.e., secondary piggyback(s)). Although secondary piggybacks are generally requests from other services, secondary piggybacks can also be from the same service. For example, a service may request more bandwidth than the maximum request size imposed by system 100. In addition, CM scheduler 114 may decide to send another request before it receives a grant for a previously transmitted request. Therefore, a cable modem 104 can have more than one piggyback request outstanding in CMTS 102, at any given time.

Figure 4A:
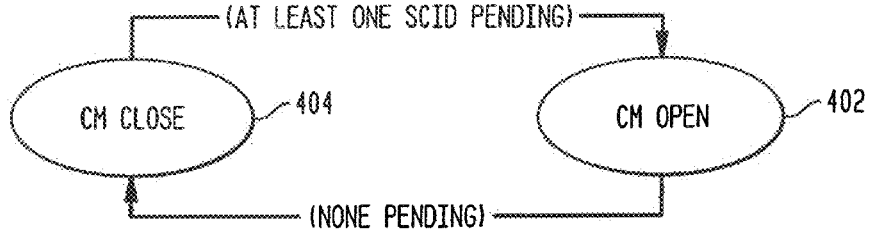
FIGS. 4a and 4b illustrate an operational flow diagram for the operating states of a cable modem.
Figure 4B:
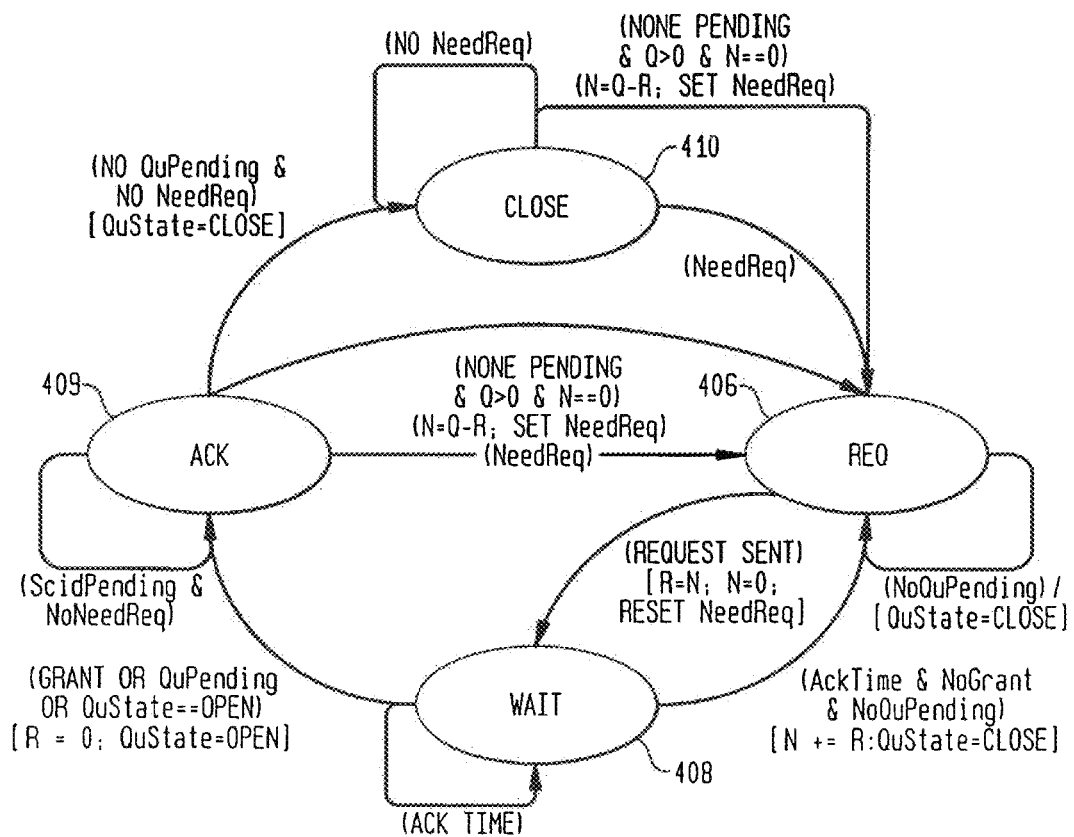

FIGS. 4a-4b illustrate an operational flow for requesting and granting bandwidth according to an embodiment of the present invention. Referring to FIG. 4a, the operational states of cable 104 are shown as being in either an open state 402 or closed state 404. Open state 402 indicates that cable modem 104 has one or more requests outstanding. Closed state 404 indicates that cable modem 104 has no outstanding requests.

FIG. 4b shows the operational flow of the various queue states for cable modem 104, according to an embodiment of the present invention. More specifically, when cable modem 104 is operating in open state 402, cable modem 104 can operate in one or more of four queues states, namely requesting state 406, waiting state 408, acknowledge state 409 and close state 410. Requesting state 406 indicates that CM scheduler 114 is requesting bandwidth from CMTS 102. Once the request has been transmitted, cable modem 104 enters waiting state 408 until feedback is received from CMTS 102. Acknowledge state 409 indicates that CMTS 102 has received the request or cable modem 104 has received a corresponding grant. If cable modem 104 remains in acknowledge state 409 or waiting state 408 beyond a predetermined time, cable modem 104 generate another request (i.e., re-enter request state 406). In other words, if cable modem 104 does not receive an acknowledgment message or grant message within a predetermined time frame, cable modem 104 will generate another request.

After all requests have been granted or there are no other pending or outstanding requests, cable modem 104 enters a close state 410. Close state 410 indicates that either output queue 112 has not recently signaled CM scheduler 114 for additional bandwidth or all requests have been granted or are no longer required.

IV. Conclusion

FIG. 1 is a conceptual illustration of system 100 that allows an easy explanation of the present invention. That is, one or more of the blocks can be performed by the same piece of hardware or module of software. It should also be understood that embodiments of the present invention can be implemented in hardware, software, or a combination thereof. In such an embodiment, the various components and steps would be implemented in hardware and/or software to perform the functions of the present invention.

Additionally, the present invention (e.g., system 100 or any part thereof) can be implemented in one or more computer systems or other processing systems. In fact, in one embodiment, the invention is directed toward one or more computer systems capable of carrying out the functionality described herein.

Figure 3:
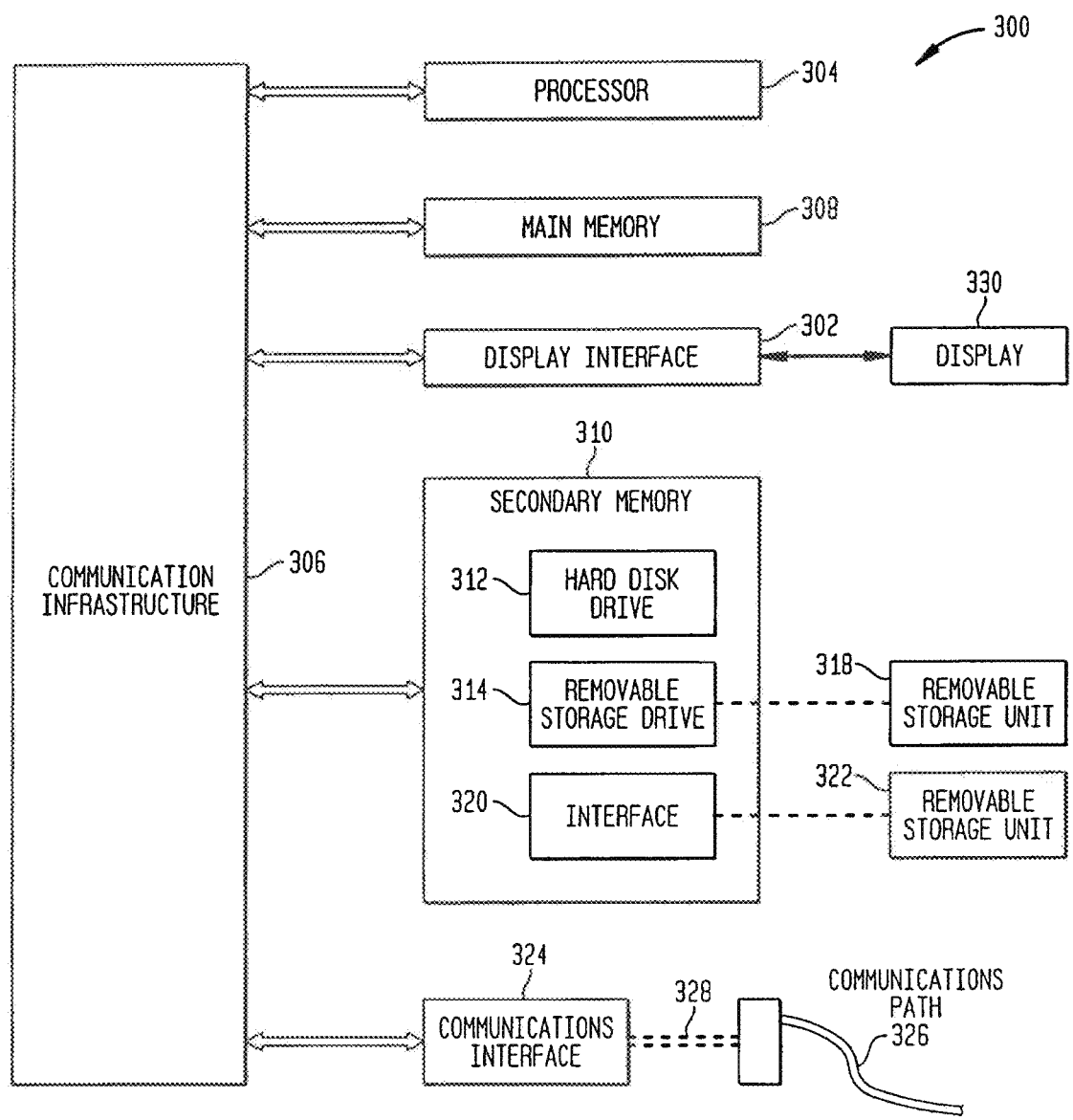
FIG. 3 illustrates a block diagram of an example computer system useful for implementing the present invention.

Referring to FIG. 3, an example computer system 300 useful in implementing the present invention is shown. The computer system 300 includes one or more processors, such as processor 304. The processor 304 is connected to a communication infrastructure 306 (e.g., a communications bus, crossover bar, or network). Various software embodiments are described in terms of this exemplary computer system. After reading this description, it will become apparent to a person skilled in the relevant art(s) how to implement the invention using other computer systems and/or computer architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc. which is read by and written to removable storage drive 314. As will be appreciated, the removable storage unit 318 includes a computer usable storage medium having stored therein computer software and/or data.

In alternative embodiments, secondary memory 310 can include other similar means for allowing computer programs or other instructions to be loaded into computer system 300. Such means can include, for example, a removable storage unit 322 and an interface 320. Examples of such can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCMCIA slot and card, etc. Software and data transferred via communications interface 324 are in the form of signals 328 which can be electronic, electromagnetic, optical or other signals capable of being received by communications interface 324. These signals 328 are provided to communications interface 324 via a communications path (i.e., channel) 326. This channel 326 carries signals 328 and can be implemented using wire or cable, fiber optics, a phone line, a cellular phone link, an RF link and other communications channels.

In this document, the terms "computer program medium" and "computer usable medium" are used to generally refer to media such as removable storage drive 314, a hard disk installed in hard disk drive 312, and signals 328. These computer program products are means for providing software to computer system 300. The invention is directed to such computer program products.

Computer programs (also called computer control logic) are stored in main memory 308 and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software can be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Moreover, it should be understood that the method and system of the present invention should not be limited to transmissions between cable modems and headends. The present invention can be implemented in any multi-nodal communications environment governed by a centralized node. The nodes can include communication gateways, switches, routers, Internet access facilities, servers, personal computers, enhanced telephones, personal digital assistants (PDA), televisions, set-top boxes or the like. Thus, the present invention should not be limited by any of the above described exemplary embodiments, but should be defined only in accordance with the following claims and their equivalents.

What is claimed is:

1. A device for providing one or more services in a wireless communications network, comprising:
    a plurality of queues associated with a plurality of services; and
    a scheduler coupled to the plurality of queues and configured to:
        send a request for bandwidth to transmit data related to a requesting service;
        receive a grant of a bandwidth region from a remote node responsive to the request;
        evaluate needs of a plurality of services by evaluating a current state of priority queues associated with each of the plurality of services, wherein the plurality of services include the requesting service and at least one other service;
        schedule packets for the plurality of services based on the evaluation; and
        wirelessly transmit the scheduled packets in the granted bandwidth region to the remote node.

2. The device of claim 1, wherein the scheduler is configured to evaluate the current state of the plurality of queues by calculating a number of packets in at least one queue.

3. The device of claim 1, wherein the scheduler is configured to evaluate the current state of the plurality of queues by determining an amount of bandwidth required for transmitting packets in at least one queue.

4. The device of claim 1, wherein the scheduler is configured to evaluate the needs of the plurality of services by evaluating at least one of throughput and latency.

5. The device of claim 1, wherein the scheduler is configured to schedule packets from a higher priority queue prior to scheduling packets from a lower priority queue.

6. The device of claim 1, wherein the scheduler is configured to wirelessly transmit a piggyback bandwidth request with the scheduled packets in the granted bandwidth region.

7. The device of claim 6, wherein the scheduler is configured to append the piggyback bandwidth request to the scheduled packets.

8. The device of claim 7, wherein the scheduler is configured to append the piggyback bandwidth request to one or more voice packets.

9. The device of claim 6, wherein the scheduler is configured to transmit the piggyback bandwidth request as a message.

10. The device of claim 6, wherein the scheduler is configured to transmit the piggyback bandwidth request in a header frame.

11. The device of claim 1, wherein the scheduler is configured to transmit multiple piggyback bandwidth requests with the scheduled packets in the granted bandwidth region.

12. A cable modem for providing one or more services, comprising:
    a plurality of queues associated with a plurality of services; and
    a scheduler coupled to the plurality of queues and configured to:
        send a request for bandwidth to transmit data related to cable modem termination system;
        receive a grant of a bandwidth region from the cable modem termination system responsive to the request;
        evaluate needs of a plurality of services by evaluating a current state of priority queues associated with each of the plurality of services, wherein the plurality of services include the requesting service and at least one other service;

schedule packets for the plurality of services based on the evaluation; and transmit the scheduled packets in the granted bandwidth region to the cable modem termination system.

13. The cable modem of claim 12, wherein the scheduler is configured to evaluate the current state of the plurality of queues by calculating a number of packets in at least one queue.

14. The cable modem of claim 12, wherein the scheduler is configured to evaluate the current state of the plurality of queues by determining an amount of bandwidth required for transmitting packets in at least one queue.

15. The cable modem of claim 12, wherein the scheduler is configured to evaluate the needs of the plurality of services by evaluating at least one of throughput and latency.

16. The cable modem of claim 12, wherein the scheduler is configured to schedule packets from a higher priority queue prior to scheduling packets from a lower priority queue.

17. The cable modem of claim 12, wherein the scheduler is configured to wirelessly transmit a piggyback bandwidth request with the scheduled packets in the granted bandwidth region.

18. The cable modem of claim 17, wherein the scheduler is configured to append the piggyback bandwidth request to the scheduled packets.

19. The cable modem of claim 18, wherein the scheduler is configured to append the piggyback bandwidth request to one or more voice packets.

20. The cable modem of claim 17, wherein the scheduler is configured to transmit the piggyback bandwidth request as a message.

21. The cable modem of claim 17, wherein the scheduler is configured to transmit the piggyback bandwidth request in a header frame.

22. The cable modem of claim 12, wherein the scheduler is configured transmit multiple piggyback bandwidth requests with the scheduled packets in the granted bandwidth region.

* * * * *